(12) United States Patent
Takahashi

(10) Patent No.: US 8,035,835 B2
(45) Date of Patent: Oct. 11, 2011

(54) PRINT CONTROL APPARATUS AND PRINT CONTROLLING METHOD

(75) Inventor: Masakazu Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1148 days.

(21) Appl. No.: 11/750,831

(22) Filed: May 18, 2007

(65) Prior Publication Data

US 2007/0273910 A1     Nov. 29, 2007

(30) Foreign Application Priority Data

May 25, 2006    (JP) ................................. 2006-145757

(51) Int. Cl.
     *H04N 1/387*      (2006.01)
     *G06K 15/00*      (2006.01)
     *G06F 3/12*      (2006.01)

(52) U.S. Cl. ...... 358/1.15; 358/452; 358/453; 358/1.12; 358/1.13

(58) Field of Classification Search .................. None
See application file for complete search history.

(56) References Cited

U.S. PATENT DOCUMENTS

| 6,304,335 | B1 * | 10/2001 | Furuya et al. ................ 358/1.15 |
| 2003/0076523 | A1 | 4/2003 | Ito et al. |
| 2005/0099644 | A1 | 5/2005 | Nomoto et al. |

FOREIGN PATENT DOCUMENTS

| EP | 0 578 264 | 1/1994 |
| JP | 6183107 | 7/1994 |
| JP | 2000-141785 | 5/2000 |
| JP | 2000141785 | * 5/2000 |

* cited by examiner

*Primary Examiner* — Benny Tieu
*Assistant Examiner* — Haris Sabah
(74) *Attorney, Agent, or Firm* — Fitzpatrick, Cella, Harper & Scinto

(57) ABSTRACT

Stop of print operation in the middle of printing is prevented from causing a stripe or unevenness on a print medium. A print control apparatus for creating print data for printing with a printing apparatus, and transmitting the created print data to the printing apparatus, includes: judging means for judging whether to transmit print data by page to the printing apparatus; and transmission controlling means for transmitting the print data by page when the judging means judges to transmit the print data by page, and transmitting each print data, into which the print data for a page is divided, when the judging means judges not to transmit the print data by page.

5 Claims, 8 Drawing Sheets

PRINT SETTING

| | |
|---|---|
| KIND OF INK TO BE USED FOR PRINTING | PIGMENT INK ▽ |
| KIND OF PRINT MEDIUM | GLOSS PAPER ▽ |
| PRINT QUALITY | HIGH QUALITY ▽ |
| SIZE OF PRINT MEDIUM | A4 ▽ |

[ OK ]  [ Cancel ]

FIG.6A

PRINT SETTING

| | |
|---|---|
| KIND OF INK TO BE USED FOR PRINTING | PIGMENT INK ▽ |
| KIND OF PRINT MEDIUM | GLOSS PAPER ▽ |
| PRINT QUALITY | HIGH QUALITY ▽ |
| SIZE OF PRINT MEDIUM | A4 ▽ |
| TRANSMIT PRINT DATA BY PAGE | AUTOMATIC DETECTION ▽ |

[ OK ]  [ Cancel ]

FIG.6B

| KIND OF INK | PRINT MEDIUM | PRINT QUALITY | SIZE OF PRINT MEDIUM | PAGE SPOOL FLAG |
|---|---|---|---|---|
| PIGMENT | NORMAL PAPER | HIGH QUALITY | A4 | ON |
| | | | A3 | ON |
| | | | POSTCARD | ON |
| | | LOW QUALITY | A4 | OFF |
| | | | A3 | OFF |
| | | | POSTCARD | OFF |
| | GLOSS PAPER | HIGH QUALITY | A4 | ON |
| | | | A3 | ON |
| | | | POSTCARD | ON |
| | | LOW QUALITY | A4 | ON |
| | | | A3 | ON |
| | | | POSTCARD | ON |
| DYE | NORMAL PAPER | HIGH QUALITY | A4 | OFF |
| | | | A3 | OFF |
| | | | POSTCARD | OFF |
| | | LOW QUALITY | A4 | OFF |
| | | | A3 | OFF |
| | | | POSTCARD | OFF |
| | GLOSS PAPER | HIGH QUALITY | A4 | OFF |
| | | | A3 | OFF |
| | | | POSTCARD | OFF |
| | | LOW QUALITY | A4 | OFF |
| | | | A3 | OFF |
| | | | POSTCARD | OFF |

FIG.7

PRINT CONTROL APPARATUS AND PRINT CONTROLLING METHOD

BACKGROUND OF THE INVENTION

1. Field of the Invention

The present invention relates to a print control apparatus and a print controlling method.

2. Description of the Related Art

A printer driver is generally installed on a print control apparatus for print-processing data of characters, tables, images and the like. When printing is performed with a printing apparatus such as an inkjet printing apparatus, graphics image data of characters, drawings, etc., and image data of natural images, etc., are created by use of various pieces of application software installed on the print control apparatus. The printer driver receives a drawing instruction based on image data supplied from the application software via an operating system (OS). Multiple gradation image data of RGB data is created (rasterized) on a memory based on the drawing data to be converted into multivalued information of cyan (C), magenta (M), yellow (Y), black (B) and the like. Thereafter, the printer driver subjects the data to pseudo gradation processing such as dithering, error diffusion (ED) or the like, lowers the number of gradations per one pixel, for example, from 8 bit to 2 bit, and then converts the data into print command data, which can be analyzed by the printing apparatus, to transmit the print command data to the printing apparatus. Such series of processings by the printer driver is called print command generation processing.

A general printer driver divides one page into a plurality of regions, the region being called a band, rasterizes the regions into a bit map, and then subjects each line of the band bit map to print command data conversion processing to transmit print commands to the printing apparatus. That is, after rasterization of the band of the top of the page is completed, the print command generation processing is performed and the print commands are transmitted every line to the printing apparatus. As a result, printing can be started by this method earlier compared with a method for performing the print command generation processing after completion of rasterization of the whole of one page, and a processing speed of whole printing is improved. Additionally, memory area used for rasterization by this method is smaller than that by the method for rasterization of the whole of one page at a time.

That is, no sufficient memory capacity can be secured in a low-priced printing apparatus such as an inkjet printing apparatus. Accordingly, there are many cases where the whole print data for one page cannot be receive data time before printing. In such a printing apparatus, a memory is provided for storing print commands for one scanning or several scannings in accordance with the number of nozzles to be used for a printing head, and print operation starts when the memory is full of print commands or receives a fixed number of print commands.

On the other hand, in the case where an arithmetic processing speed of a host computer used by a user is low, or data requiring a complicated image processing is printed, it takes a long time to generate print commands, and a print command generation speed is sometimes lower than a printing speed of the printing apparatus. That is, the printing apparatus cannot start the print operation, that is, scanning of the printing head, until receiving a fixed number of print commands, and thus the operation stops until sufficient print commands are transmitted. Accordingly, depending on the kind of ink or a print medium to be used for printing, when the printing head stops in the middle of printing, unevenness or a stripe (hereinafter, also referred to as print unevenness) sometimes appears at a connection part between an already printed part and a part where printing is restarted.

A technology (Japanese Patent No. 3397350) is conventionally known that, in order to avoid the above problem, reduces the number of nozzles to be used by the printing head and performs print scanning in the case where the printing apparatus cannot receive a fixed number of print commands even if a certain time passes. In the case where the memory is not full of print commands even if a predetermined time passes, or cannot receive a fixed number of print commands, the number of nozzles to be used is reduced and print scanning is performed, and thus interruption of printing can be prevented from causing the print unevenness.

However, depending on the kind of application software or image data, the printing apparatus sometimes cannot receive a print command at all for a long time in the case where the data requires an extremely complicated image processing or the like. In such a case, even if a predetermined time passes, printing cannot be performed even though the number of used nozzles is reduced, and the print unevenness cannot be prevented when printing is restarted after receiving a print command.

Additionally, there exists a technology that generates all print commands once to transmit them to the printing apparatus. However, in the case where there is print data for a plurality of pages, printing is started after the end of the print command generation processing for the print data for the plurality of pages, and thus the waiting time until the start of printing is lengthened, and consequently the processing speed of the whole printing is lowered.

SUMMARY OF THE INVENTION

In view of the above problems, the present invention was made, and it is an object of the present invention to provide a print control apparatus and a print controlling method for restraining a lowering of print quality even if print operation is stopped in the middle of printing of one page.

The present invention provides A print control apparatus for creating print data for printing with a printing apparatus, and transmitting the created print data to the printing apparatus, comprising: print mode setting means for setting print mode based on conditions of printing that are set by an operator; judging means for judging whether to transmit print data by page to the printing apparatus based on contents of print mode set by the print mode setting means; and transmission controlling means for transmitting the print data by page when the judging means judges to transmit the print data by page, and transmitting each print data, into which the print data for a page is divided, when the judging means judges not to transmit the print data by page.

According to the above constitution, it is judged whether the print unevenness is caused by interruption, or whether interruption of printing has an influence on print image quality, even if printing is interrupted in the middle of the page, and thus it can be judged whether to transmit the print data by page to the printing apparatus. Hence, when the interruption of printing has an influence on the print image quality, the print data for one page is transmitted, and thus the print operation can be prevented from being interrupted in the printing apparatus in the middle of the page. As a result, a stripe or unevenness can be prevented from arising on the print medium, and a high quality printing can be performed. That is, even if the print operation stops for a long time, there is a possibility that no unevenness or stripe is caused in the print result depending on the kind of ink or print paper to be used in printing, and quality setting of a print result. Thus, it is judged whether to transmit the print data by page based on a condition that the print unevenness is generated or not generated.

Further features of the present invention will become apparent from the following description of exemplary embodiments (with reference to the attached drawings).

BRIEF DESCRIPTION OF THE DRAWINGS

FIG. 5 is a diagram showing the relation ship of FIGS. 5A and 5B.

FIGS. 6A and 6B are diagrams each illustrating a user interface screen for setting a print mode according to the first embodiment of the present invention; and FIG. 7 is a table indicating an example of judgment conditions of a page spool flag according to the first embodiment of the present invention.

DESCRIPTION OF THE EMBODIMENTS

An embodiment of the present invention will be described in detail hereinafter with reference to the accompanying drawings.

First Embodiment

Figure 1:
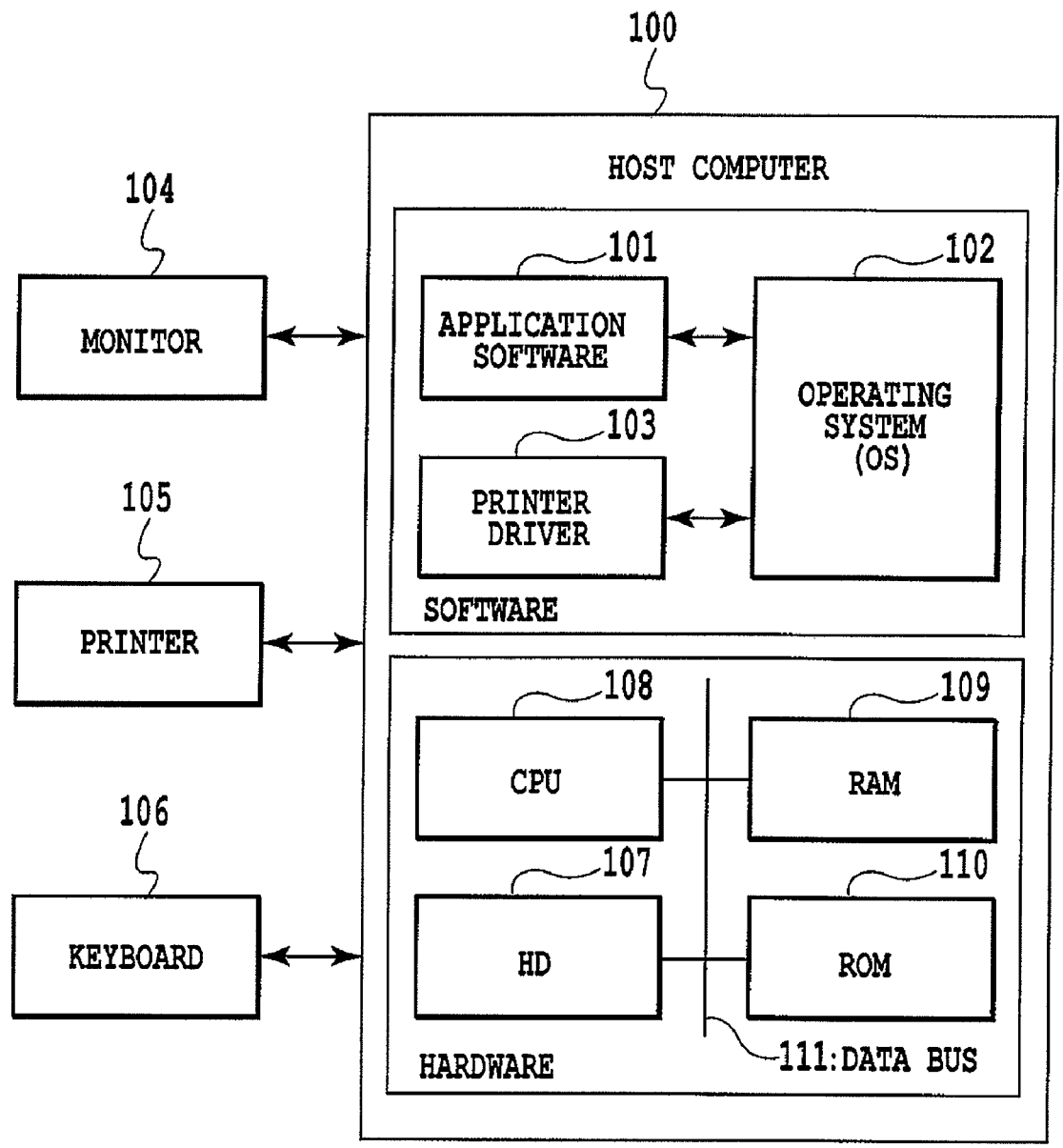
FIG. 1 is a block diagram illustrating a printing system according to a first embodiment of the present invention.

FIG. 1 is a block diagram illustrating a printing system according to a first embodiment of the present invention.

The reference symbol 100 denotes a host computer provided with a print control apparatus, 105 denotes a printing apparatus such as an inkjet printing apparatus, 104 denotes a monitor, and 106 denotes an input device such as a keyboard. The printing apparatus 105, the monitor 104 and the keyboard 106 are connected to the host computer 100 by cables or radio. The host computer 100 has pieces of application software 101 such as word processing, spreadsheet, Internet browser, a printer driver 103 and an operating system (OS) 102. Additionally, the host computer 100 includes: a central processor unit (CPU) 108; a hard disk (HD) 107; a random access memory (RAM) 109; a read only memory (ROM) 110; and a data bus 111 for connecting them to each other.

These pieces of hardware can run the software, and a drawing instruction group (image drawing instruction, text drawing instruction and graphics drawing instruction), which is issued to the OS 102 and illustrates an output image, are processed by the pieces of application software 101. Then, print data is created by the printer driver 103. The printing apparatus 105 analyzes the print data received from the host computer 100, and performs printing based on the analysis result. Printing is performed in a manner that ink droplets are jetted from nozzles of a printing head to be adhered to a print medium while the printing head is scanning-moved in a main scanning direction relative to the print medium and the print medium is moved in a sub-scanning direction.

The monitor 104 displays a user interface (UI) for setting a print mode for controlling the printing apparatus 105. A user performs input-operation for the print mode on the UI screen by inputting means such as the keyboard 106 in accordance with a setting screen, and can issue an instruction to the host computer 100. The host computer 100 can control the printing apparatus 105 based on the setting contents of the print mode.

The pieces of application software 101 on the host computer 100 create text data such as characters, graphics data such as drawings, and image data such as natural images, as output image data.

The pieces of application software 101 transmit an output request to the OS 102, and issue the drawing instruction group, which is constituted by the text drawing instructions, the graphics drawing instructions and the image drawing instructions, and which illustrates the output image, to the OS 102. Then, the OS 102 receives the output request from the pieces of application software 101 to issue an output request to the printer driver 103 corresponding to the printing apparatus 105. After the output request is transmitted from the OS 102, the printer driver 103 performs initialization processing, secures a working area for bands, and transmits coordinate data (band size data) of the secured area to the OS 102. Thus, created output image data is outputted.

Figure 2:
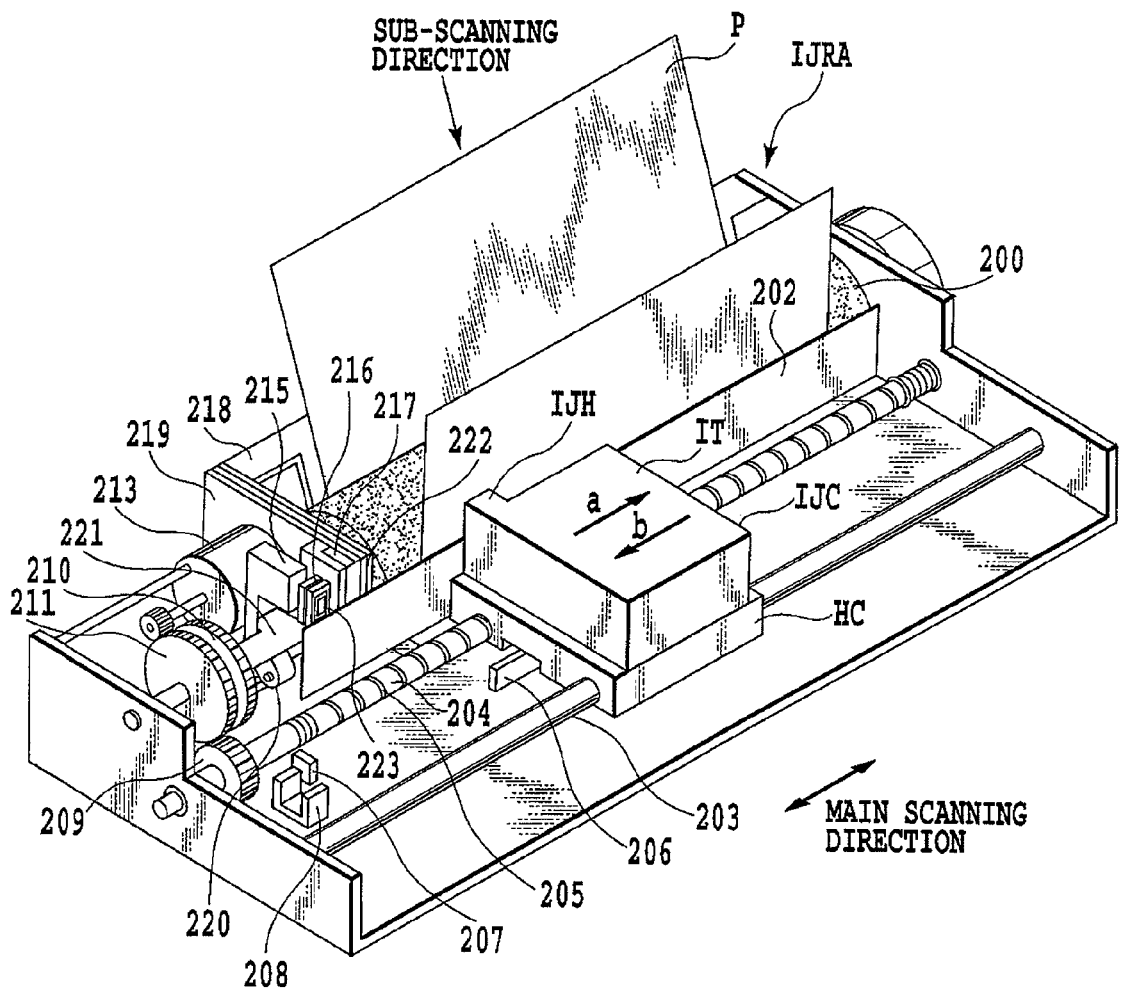
FIG. 2 is a perspective view of an inkjet printing apparatus according to the first embodiment of the present invention.

FIG. 2 is a perspective view of an inkjet printing apparatus IJRA applicable to the present embodiment.

A carriage HC moves with normal and reverse rotation of a driving motor 213, engages with a screw groove 204 of a rotating lead screw 205 via driving force transmission gears 209 to 211, and is supported by a guide rail 203 to reciprocate in directions indicated by arrows a and b (main scanning direction). An integration type inkjet cartridge IJC having a built-in printing head IJH and an ink tank IT is mounted on the carriage HC. Moreover, in the present embodiment, the ink tank IT and the printing head IJH are formed integrally with each other so as to constitute the exchangeable ink cartridge IJC. However, a constitution may be employed that the ink tank IT and the printing head IJH can be separated from each other.

A paper pressing plate 202 presses a print medium P against a platen 200 in a moving direction of the carriage HC. Photo-couplers 207 and 208 check existence of a lever 206 of the carriage to detect a home position for performing, for example, switching a rotating direction of the motor 213.

A cap member 222 for capping the front surface of the printing head IJH is supported by a member 216, and suction recovery of the printing head is performed by a sucking device 215 for sucking the inside of the cap via a cap inner opening 223. A cleaning blade 217 moves in the front and rear directions by a member 219. The cleaning blade 217 and the member 219 are supported by a body supporting plate 218. Additionally, a lever 221 is used for starting suction of the suction recovery, moves with movement of a cam 220 engaging with the carriage, and the movement of the lever 221 is controlled with a known transmitting mechanism in which, for example, driving force applied from the driving motor is switched by a clutch.

The capping, cleaning, and suction recovery are each performed at the corresponding position by an action of the lead screw 205 when the carriage is in a region on the home position side. However, the capping, cleaning, and suction recovery may each be performed at a known timing.

Figure 3:
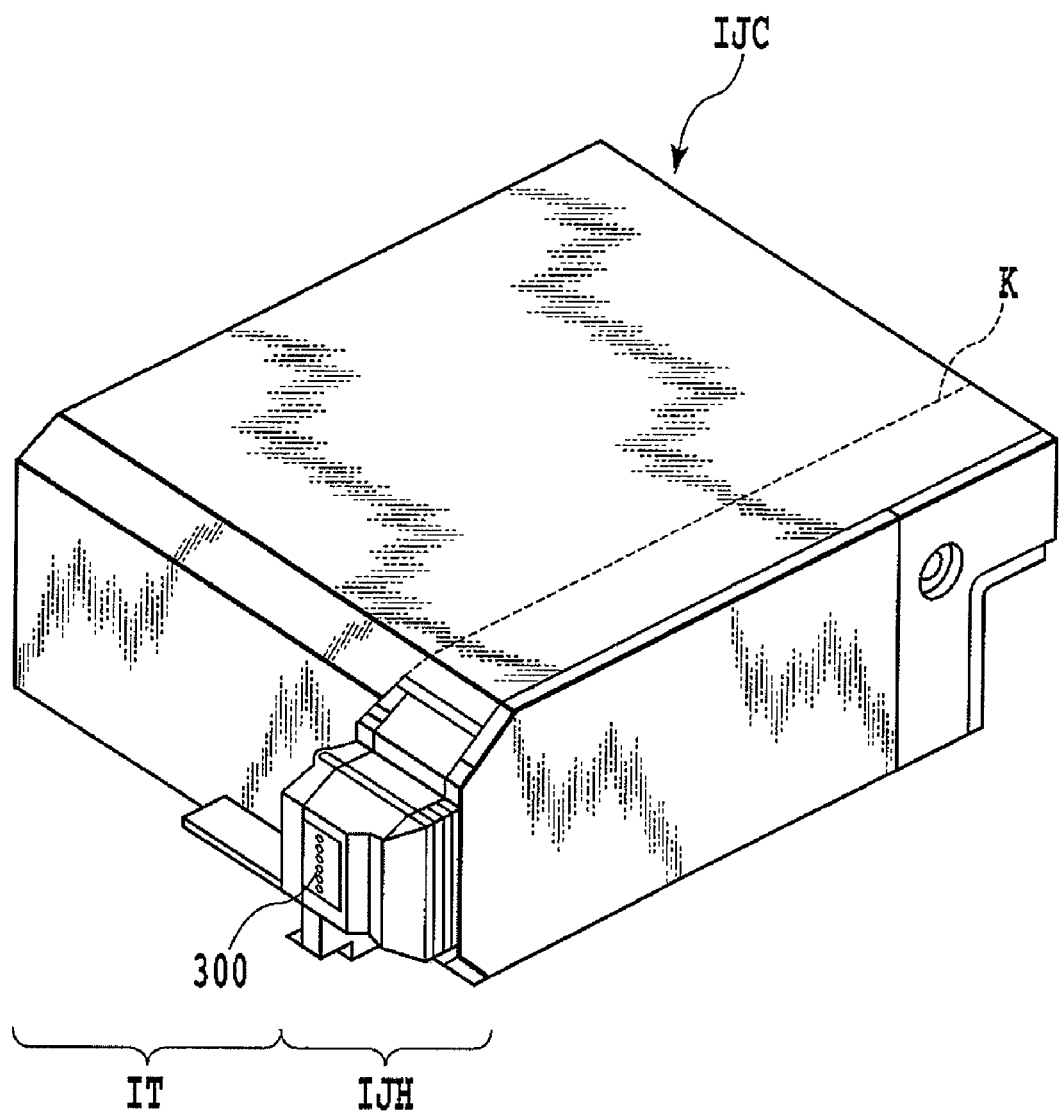
FIG. 3 is a perspective view of an ink cartridge according to the first embodiment of the present invention.

FIG. 3 is a perspective view of the ink cartridge IJC in which the ink tank and the printing head can be separated from each other. A fiber-shaped or porous-shaped ink absorbing body for keeping ink is provided in the ink tank IT.

In the ink cartridge IJC, the ink tank IT and the printing head IJH can be separated from each other along a border line K. An electrode (not shown), which receives an electric signal supplied from the carriage HC side when the ink cartridge IJC is mounted on the carriage HC, is provided on the ink cartridge IJC. The printing head IJH is driven by the electric signal so that ink is jetted from jetting ports of an ink jetting port line 300.

Figure 4:
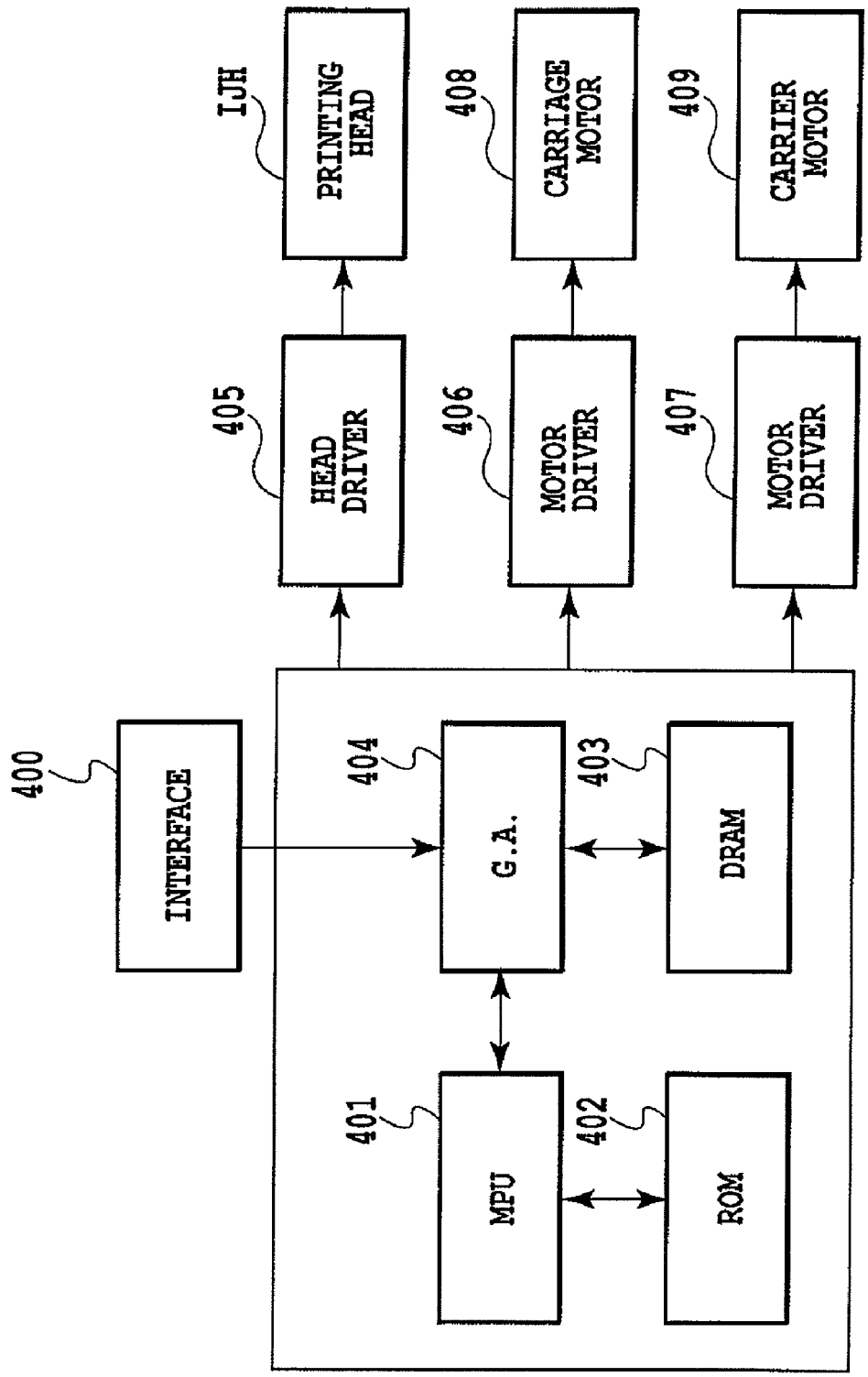
FIG. 4 is a block diagram illustrating a control circuit of the inkjet printing apparatus according to the first embodiment of the present invention.

FIG. 4 is a block diagram illustrating a control circuit of the inkjet printing apparatus. In FIG. 4, the reference symbol 400 denotes an interface for inputting a print signal, 401 denotes a MPU, 402 denotes a ROM, and 403 denotes a DRAM for storing various kinds of data (print signal, print data to be supplied to the printing head, etc.). The ROM 402 stores a control program to be executed by the MPU 401. The reference symbol 404 denotes a gate array (G. A.) for performing supply control of the print data to the printing head IJH, and the gate array performs data transmission control between the interface 400, the MPU 401 and the RAM 403. The reference symbol 409 denotes a carrier motor for carrying the printing head IJH, and 408 denotes a carriage motor for carrying a print paper. Additionally, the reference symbol 405 denotes a head driver for driving the printing head, and 406 and 407 denote motor drivers for driving the carriage motor 408 and the carrier motor 409 respectively.

The print signal is inputted into the interface 400 so as to be converted into the print data for printing between the G. A. 404 and the MPU 401. The print data is temporarily stored in the DRAM 403 until the amount thereof reaches an amount for driving the printing head. Then, the motor drivers 406 and 407 are driven, the printing head is driven in accordance with the print data transmitted to the head driver 405, and printing is performed.

Figure 5A:
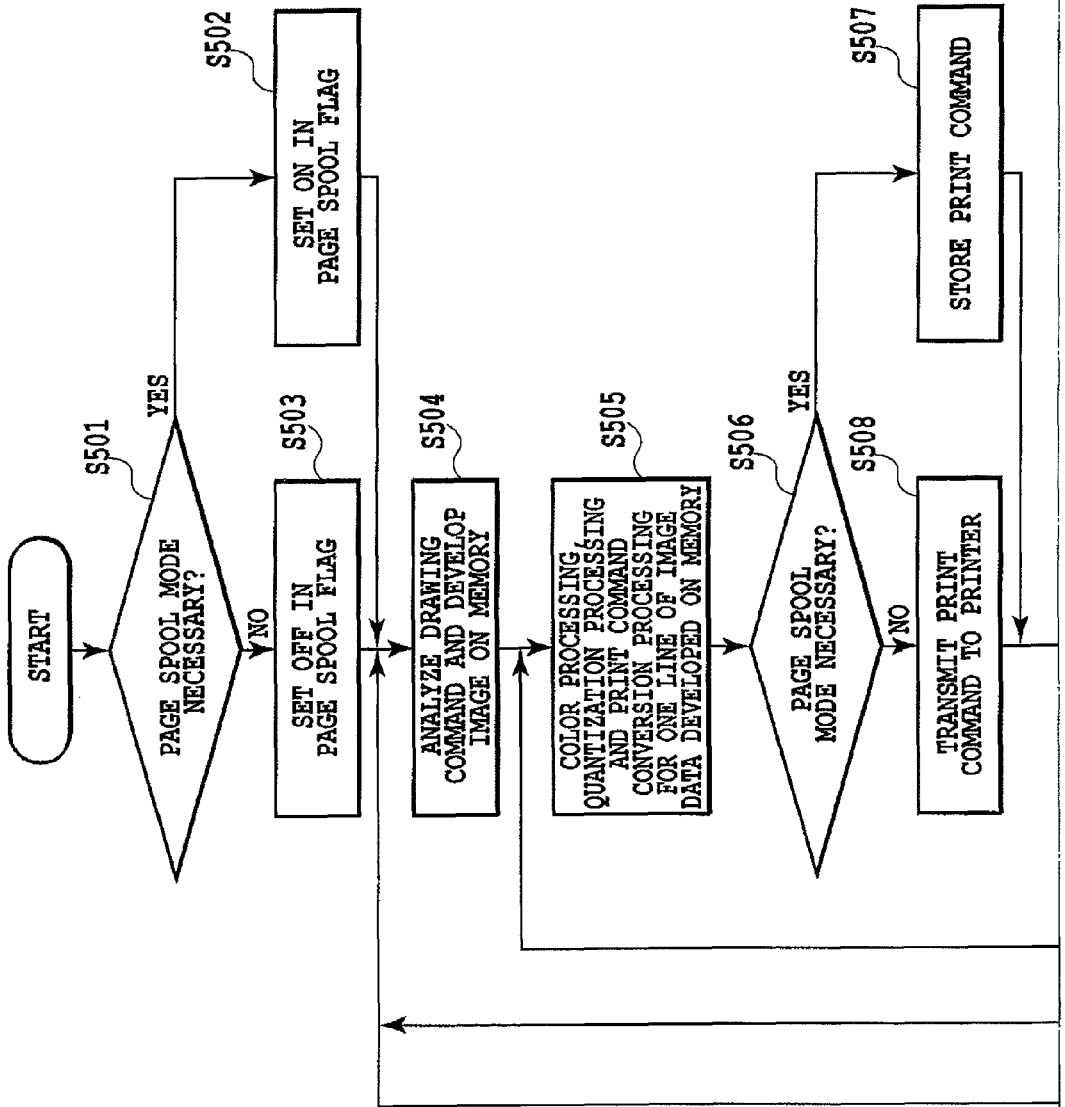
FIGS. 5A and 5B are a flowchart indicating print command generation processing according to the first embodiment of the present invention.
Figure 5B:
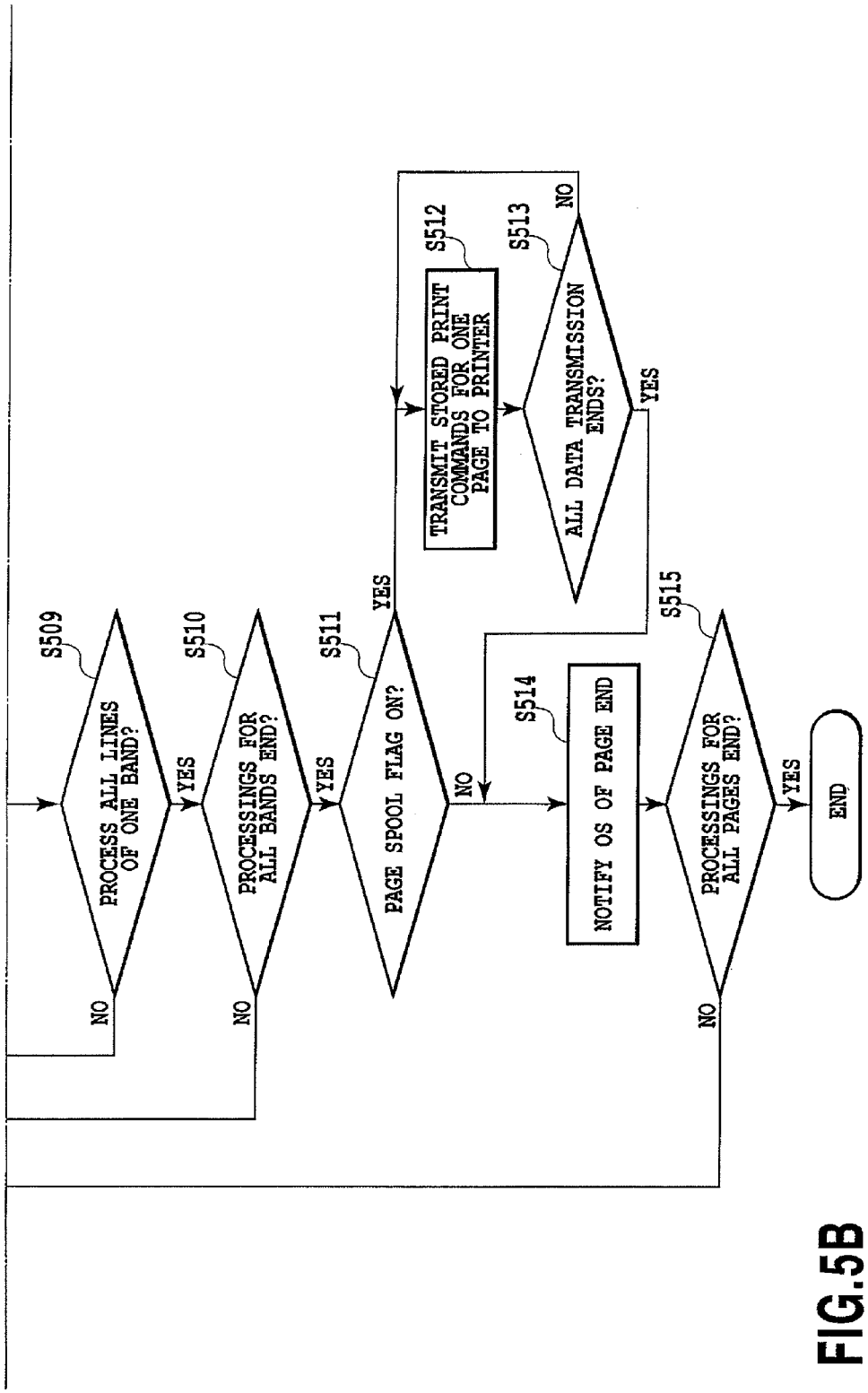

FIGS. 5A and 5B area flow chart indicating print command generation processing according to the present embodiment. Regarding the embodiment, operation in the case where a banding type printer driver using a rasterizing function of the operating system will be described as print operation.

The printer driver 103 receives the output request from the OS 102 to perform the initialization processing. When the initialization processing is started, it is judged whether to transmit the print commands by page (hereinafter, also referred to as page spool processing) (S501). When the page spool processing is required, "ON" is set into a page spool flag (S502). When the page spool processing is not required, "OFF" is set into the page spool flag (S503).

FIGS. 6A and 6B each shows the user interface (UI) screen which is displayed on the monitor 104 and used for setting the print mode for controlling the printing apparatus 105. It is judged whether the page spool processing is required, via the screen.

As shown in FIG. 6A, various print modes such as the print mode including the kind of the ink to be used in printing, the kind of the print medium, quality of a print result and the size of the print medium, can be set via the UI. In the present embodiment, items are prepared that indicate "kind of ink to be used for printing," "kind of print medium," "print quality" and "size of print medium." In "kind of ink to be used for printing," either "pigment ink" or "dye ink" can be selected. In "kind of print medium," either "normal paper" or "gloss paper" can be selected. In "print quality," either "high quality" or "low quality" can be selected. In "size of print medium," any one of "A4," "A3" and "postcard" can be selected.

Moreover, an element to be set is not limited to the above elements. For example, the kind of data such as text data and image data or the like is applicable to the element to be set.

Additionally, as the above described judgment condition, a judgment can be employed that if a processing amount of subject image data regarding image resolution information or setting of a paper size in print processing is small, the processing speed of the printer driver is sufficiently higher than the printing speed of the printing apparatus and the printing head hardly stops.

A database, into which a judgment condition on whether "ON" is set into the page spool flag in accordance with print settings in the print mode is made, is required to be prepared in the printer driver 103 beforehand. Then, in the page spool mode judgment processing (S501), it is judged whether the page spool mode is necessary in accordance with the judgment condition.

FIG. 7 is a table showing an example of the judgment conditions of the page spool flag. For example, in the case where the pigment ink is used, there is a possibility that print unevenness arises when printing is interrupted, but in the case where the dye ink is used, the print unevenness can hardly arise even when the printing is interrupted. Accordingly, when the dye ink is used, the pages pool flag becomes "OFF." Additionally, in the case where processing time of the driver is sufficiently shortened depending on a combination of printing conditions and the processing speed of the driver is sufficiently higher than the printing speed of the printing apparatus, the page spool flag becomes "OFF." For example, in the case where printing is performed on the normal paper with the pigment ink, if "low quality" is selected, the page spool flag becomes "OFF" since the processing time of the driver is sufficiently short in this combination.

As shown in FIG. 6A, when "pigment ink," "gloss paper," "high quality" and "A4" are selected, the page spool flag becomes "ON."

Moreover, setting means for setting whether to perform the page spool mode processing may be provided on the UI screen. FIG. 6B shows an example of the UI screens for setting a print mode having an item for selecting whether to perform the page spool processing. In the present embodiment, in an item of "transmit print data by page," any one of "transmit," "not transmit" and "automatic detection" can be selected. In this case, only when "automatic detection" is selected, it is judged whether "ON" or "OFF" is set into the page spool flag prepared beforehand.

Referring to FIGS. 5A and 5B again, the printer driver 103 successively rasterizes the drawing instruction group transmitted from the OS 102 onto the band memory in a RGB 24-bit format (S504).

Then, contents of the band memory are subjected to color conversion processing every scan line after all the drawing instructions are rasterized (S505). Here, the OS 102 transmits the given drawing instruction group in the band size to the printer driver 103.

The printer driver 103 in the host computer 100 performs image development processing for the raster type printing apparatus 105 having no page description language in the present embodiment. In this case, no sufficient storage device capable of developing the drawing instructions of the whole page is generally mounted on the host computer 100, and therefore images are created on the memory in each of the units called bands into which one page is divided in laterally long and narrow form. Accordingly, it is necessary to secure a working area for bands.

Then, the images are converted into CMYK data to be subjected to quantization processing, and finally subjected to the print command generation processing for converting the data into a print command format with which the printing apparatus 105 can print (S505).

Next, it is judged whether the page spool flag is "ON" after the print command generation processing (S506). When the flag is "ON," the generated print commands are stored in areas secured in the memory 109 and the HD 107 in storage processing of the generated print commands (S507).

When the flag is "OFF," the operating system 102 transmits the generated print commands to the printing apparatus 105 by use of a spooler function (S508).

Either processing of transmitting the print commands to the printing apparatus (S508) or of storing the print commands in the secured areas (S507) is repeated by the height of the band memory by the conversion processing for converting the contents of the band memory into the print commands every scan line (S505) and the page spool flag.

It is judged whether the processings for one band end (S509), and the printer driver 103 returns the processings to the OS 102 after the processings for one band is completed. The OS 102 repeats issuance of all the drawing instruction groups in one page created by the pieces of application software 101 for every band to perform the processings for one page.

The printer driver 103 judges whether the processings for all the bands end (S510), and checks the page spool flag at the time of end of the processings for all the bands (S511).

When the page spool flag is "ON," the print command generation processing (S505) and the print command storage processing (S507) are performed for one page, and storage of the print commands for one page is completed. Accordingly, the print commands for one page, which have already been stored, are read out to be transmitted to the printing apparatus 105 by use of the spooler function of the operating system 102 (S512). It is checked whether transmission of all the stored print command data is completed (S513), the processings are returned to the OS 102 at the time of the end of transmission of all the print command data, and page end is notified (S514).

As described above, the print commands generated every scan line are transmitted, in the case where no influence is applied to the print quality even if printing is interrupted in the middle of the page, or where the data processing amount is not large depending on setting, and thus the processing speed is sufficiently higher than the printing speed, so that there is no interruption for printing. On the other hand, when the above conditions are not satisfied, the print commands can be transmitted by page to the printing apparatus. The print commands for one page are collectively transmitted, and thus print operation can be prevented from interrupting in the middle of the page in the printing apparatus, and a stripe or unevenness can be prevented from arising on the print medium. As a result, printing can be performed at high quality. That is, even if the print operation stops for a long time, there is a possibility that no unevenness or stripe is generated in the print result depending on the kind of ink or print paper to be used in printing or quality setting for a print result. That is, it is judged whether to transmit the print data by page based on a condition that the print unevenness is generated or not generated.

On the other hand, in the case where the page spool flag is "OFF," since transmission of the print commands for the corresponding page has already been ended, the processings are returned to the OS 102 and the page end is notified.

The OS 102 starts rasterization processing of the next page after receiving the notification of the page end from the printer driver. Therefore, other processings are performed as little as possible during the transmission of the print commands for one page, and the transmission processing can be prevented from slowing down.

The OS 102 issues a print ending instruction to the printer driver 103, and the printer driver ends the print command generation processing, at the time when issuance of all the drawing instruction groups is completed which is created by the pieces of application software 101 and is in all the pages (S515).

Moreover, in the embodiment, a value that is set in the page spool flag based on the judgment of the page spool processing judging means at print start is not changed in the middle of processing of one page. That is, in the present embodiment, check processing for the page spool flag is performed at the timing of switching the processing. However, the check may be performed only at the print start in the present invention. There may exist two flows that processings applicable only in the case where the page spool flag is "ON" are continuously performed, and that processings applicable only in the case where the page spool flag is "OFF" are continuously performed.

Additionally, the page spool processing may not be performed even in the case where it is judged the page spool processing is performed in accordance with print setting information at the print start. That is, all drawing command information for one page is analyzed before printing, the page spool processing is performed only in the case where there exists an instruction of processing bit map data, and the page spool flag can be dropped in the case where there exist only other instructions. In this case, the page spool processing is not performed.

As described above, the print command generating means for generating a print command is provided, and thus it can be judged whether to generate and transmit print commands by page to the printing apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-145757, filed May 25, 2006, which is hereby incorporated by reference herein in its entirety.

What is claimed is:

1. A print control apparatus for creating print data for printing with a printing apparatus, and transmitting the created print data to the printing apparatus, comprising:
 print mode setting means for setting print mode based on conditions of printing that are set by an operator;
 judging means for judging whether to transmit print data by page to the printing apparatus based on contents of print mode set by the print mode setting means; and
 transmission controlling means for transmitting the print data by page when the judging means judges to transmit the print data by page, and transmitting each print data, into which the print data for a page is divided, when the judging means judges not to transmit the print data by page,
 wherein the judging means judges whether to transmit the print data by page to the printing apparatus based on conditions that interruption in the middle of printing by each of the pages different in each set print mode has on print image quality.

2. The print control apparatus according to claim 1, wherein the conditions are the kind of ink to be used for printing, the kind of a print medium, print quality and the size of the print medium.

3. A print controlling method for creating print data for printing with a printing apparatus, and transmitting the created print data to the printing apparatus, comprising:

a print mode-setting step for setting print mode based on conditions of printing that are set by an operator;

a judging step for judging whether to transmit print data by page to the printing apparatus based on contents of print mode set by the step of print mode-setting; and a transmission controlling step for transmitting the print data by page when the step of judging judges to transmit the print data by page, and transmitting each print data, into which the print data for a page is divided, when the step of judging judges not to transmit the print data by page, wherein the judging step judges whether to transmit the print data by page to the printing apparatus based on conditions that interruption in the middle of printing by each of the pages different in each set print mode has on print image quality.

4. The print controlling method according to claim 3, wherein the conditions are the kind of ink to be used for printing, the kind of a print medium, print quality and the size of the print medium.

5. A non-transitory computer-readable storage medium storing a computer program for making a print control apparatus perform print control processing that creates print data for printing with a printing apparatus and transmits the created print data to the printing apparatus, comprising:

a print mode-setting step for setting print mode based on conditions of printing that are set by an operator;

a judging step for judging whether to transmit print data by page to the printing apparatus by the control processing based on contents set with the step of print mode-setting; and a transmission controlling step for transmitting the print data by page when the step of judging judges to transmit the print data by page, and transmitting each print data, into which the print data for a page is divided, when the step of judging judges not to transmit the print data by page, wherein the judging step judges whether to transmit the print data by page to the printing apparatus based on conditions that interruption in the middle of printing by each of the pages different in each set print mode has on print image quality.

* * * * *